United States Patent Office 3,061,522
Patented Oct. 30, 1962

3,061,522
PROCESS FOR THE PRODUCTION OF
DEMETHYLTETRACYCLINES
Saul Lewis Neidleman, Highland Park, N.J., assignor to
Olin Mathieson Chemical Corporation, New York,
N.Y., a corporation of Virginia
No Drawing. Filed Jan. 10, 1962, Ser. No. 165,295
5 Claims. (Cl. 195—80)

This invention relates to an improved process for the production of 7-chloro-6-demethyltetracycline and, more particularly, to an improvement in the process of producing 7-chloro-6-demethyltetracycline by culturing 7-chlorotetracycline-producing strains of Streptomyces.

This application is a continuation-in-part of a previous application Serial No. 90,234, filed February 20, 1961, and now abandoned.

Prior to the present invention, 7-chloro-6-demethyltetracycline has been produced by culturing selected mutant strains of *S. aureofaciens* in contact with nutrient media of varying compositions. The antibiotic thus produced is characterized by extreme chemical stability, notably in strong acid and alkali solutions, and by its increased retention in the circulatory system of man. Hence, the therapeutic importance of the 7-chloro-6-demethyltetracycline is unquestionable. It is, therefore, desirable that the simplest and most effective procedures for the production of this antibiotic be provided. This means, of course, that it is highly desirable to achieve the production of 7-chloro-6-demethyltetracycline with a minimum of restriction on the source of microorganism which can be employed and without the burden of selecting particular strains of microorganisms for use in the fermentation process for producing 7-chloro-6-demethyltetracycline.

It has been found in accordance with the present invention that 7-chloro-6-demethyltetracycline can be produced in good yield from any 7-chlorotetracycline-producing strain of Streptomyces when aminopterin (4-aminopteroylglutamic acid) or a salt thereof is added to a growing culture of a 7-chlorotetracycline-producing strain of Streptomyces. The aminopterin is present in an inhibiting concentration, preferably about 100 mg. per liter to 1,000 mg. per liter, and optimally about 400 mg. per liter to about 800 mg. per liter.

Among the tetracycline-producing strains of Streptomyces which have been successfully employed in the preparation of 7-chloro-6-demethyltetracycline by the novel process of the present invention are the following: *S. aureofaciens* ATCC 13899; *S. aureofaciens* ATCC 13900; *S. aureofaciens* ATCC 12416a; *S. aureofaciens* ATCC 12416b; *S. aureofaciens* ATCC 12416c; *S. aureofaciens* NRRL B 1288; *S. aureofaciens* NRRL 2209; *S. aureofaciens* NRRL B 1286; *S. aureofaciens* NRRL B-1287; and *S. viridofaciens* ATCC 11989.

The fermentation procedure employed in the novel process of the present invention may be carried out in accordance with the conditions generally employed in the productions of tetracycline. Thus, the nutrient medium, conditions of time, temperature and pH control, aeration, and the like will conform to those employed in the production of tetracycline as set out in U.S. Patent No. 2,734,018.

When a fermentation medium low in biologically available chloride, that is, a medium containing only such chloride as is normally present as a constituent of one of the components of the medium, is employed in the presence of aminopterin, variable amounts of tetracycline and 7-chlorotetracycline will form in addition to the desired 7-chloro-6-demethyltetracycline.

If a source of biologically available chloride is included in the fermentation medium in the presence of aminopterin, then 7-chloro-6-demethyltetracycline and 7-chlorotetracycline will form to the near exclusion of tetracycline.

The following examples are illustrative of the practice of this invention:

Example 1

A culture of *Streptomyces aureofaciens* (ATCC 13900) is grown in approximately 50 ml. of an aqueous medium containing, per 1,000 ml., 30 gm. extraction process soybean meal, 50 gms. glucose and 7 gm. calcium carbonate in a 250 Erlenmeyer flask. The flask is agitated on a rotary shaker (280 cycles per minute) in a room maintained at 25° C. for a period of 72 hours. Ten percent of the resulting inoculum is then transferred to a 250 ml. Erlenmeyer flask containing 50 ml. of the medium employed above and the flask agitated a further 72 hours under the same conditions. One ml. of the resulting inoculum is then employed for the inoculation of 10 ml. of an aqueous medium containing, per 1000 ml., 30 gms. extraction process soybean meal, 50 gms. glucose and 7 gms. calcium carbonate, in a 1" x 6" test tube. Five mg. of sterile aminopterin is added to the tube and the tube is shaken on a rotary shaker at 280 cycles per minute at 25° C. for seven days. The contents of the tubes are then acidified to pH 2 by the addition of sulfuric acid and centrifuged. Examination of the supernatant liquid by paper chromatography employing the methods of Bohonos et al. (Antibiotics Annual, 1953–54, page 49), demonstrates the presence of 7-chloro-6-demethyltetracycline, 7-chloro-tetracycline and tetracycline.

Example 2

Example 1 is repeated, except that instead of the five mgs. of sterile aminopterin employed, the sodium salt thereof obtained by dissolving five mgs. of aminopterin in one ml. of a 0.1% solution of $Na_2CO_3$ is added to the tube containing the inoculum and medium. The contents of the tube are then acidified to pH 2 by the addition of sulfuric acid and centrifuged. Examination of the supernatant liquid by paper chromotography, employing the methods of Bohonos et al. (Antibiotics Annual, 1953–54, page 49), demonstrates the presence of 7-chloro-6-demethyltetracycline, 7-chlorotetracycline and tetracycline.

Example 3

A culture of *Streptomyces aureofaciens* (ATCC 13900) is grown in approximately 50 ml. of an aqueous medium containing, per 1000 ml., 30 gms. extraction process soybean meal, 50 gms. glucose and 7 gm. calcium carbonate in a 250 ml. Erlenmeyer flask. The flasks are agitated on a rotary shaker (280 cycles per minute) in a room maintained at 25° C. for a period of 72 hours. A 10% transfer of the resulting inoculum is made to a 250 ml. Erlenmeyer flask containing 50 ml. of the medium employed above and the flask is agitated under the same conditions for an additional 72-hour period. One ml. of the resulting inoculum is then employed for the inoculation of 10 ml. of an aqueous medium containing, per 1000 ml., 30 gms. extraction process soybean meal, 50 gms. glucose, 1 gm. sodium chloride and 7 gms. calcium carbonate in a 1" x 6" test tube. Five mg. of sterile aminopterin is added to the tube and the tube is shaken on a rotary shaker at 280 cycles per minute at 25° C. for seven days. The contents of the tube were then acidified to pH 2 by the addition of sulfuric acid and centrifuged. Examination of the supernatant liquid by paper chromatography employing the methods of Bohonos et al. (Antibiotics Annual, 1953–54, page 49), demonstrates the presence of 7-chloro-6-demethyltetracycline, 7-chlorotetracycline and trace amount of tetracycline.

Example 4

To a 250 ml. Erlenmeyer flask containing 50 ml. of an aqueous medium containing, per 1000 ml., 30 gms. extraction process soybean meal, 50 gms. glucose, 7 gms. calcium carbonate and 1 gm. sodium chloride there is added 25 mg. of sterile aminopterin and 1 ml. of an inoculum of *S. aureofaciens* (ATCC 13900) prepared as in Example 1. The flask is shaken on a rotary shaker at 280 cycles per minute at 25° C. for seven days. The contents of the flask are then acidified to pH 2.0 with sulfuric acid. The mixture is stirred for 15 minutes and filtered with the aid of Hyflo. The filtrate is adjusted to pH 9.0 with sodium hydroxide and extracted with three 350 ml. portions of n-butanol. The solvent phase is acidified to pH 2.2 with sulfuric acid and allowed to stand in the cold room for 65 hours. The solvent phase is then filtered and upon chromatographic examination in accordance with the procedure employed in Example 1 the presence of 7-chloro-6-demethyltetracycline, 7-chlorotetracycline and tetracycline is demonstrated.

The n-butanol is then removed under high vacuum at 50° C. The brown viscous residue is suspended in a mixture of 100 ml. distilled water and 10 ml. of concentrated hydrochloric acid and heated at 75° C. for 30 minutes. After cooling, the mixture is adjusted to pH 1.8 with potassium hydroxide and filtered. The filtrate is extracted with 22 ml. of chloroform. The resulting aqueous layer is extracted with 100 ml. n-butanol. The butanol extract, upon chromatographic examination according to the procedure employed in Example 1, demonstrated the presence of 7-chloro-6-demethyltetracycline. Only the slightest traces of other bioactive materials can be noted.

Similarly, if other *Streptomyces aureofaciens*, such as *Streptomyces aureofaciens* ATCC 12416a, or a *Streptomyces viridofaciens* (e.g., *Streptomyces viridofaciens* ATCC 11989) is substituted for the *Streptomyces aureofaciens* ATCC 13900 in the preceding examples, 7-chloro-6-demethyltetracycline is also formed.

This invention may be variously otherwise embodied within the scope of the appended claims.

What is claimed is:

1. A process for the production of 7-chloro-6-demethyltetracycline which comprises cultivating a 7-chlorotetracycline-producing microorganism selected from the group consisting of *Streptomyces aureofaciens* and *Streptomyces viridofaciens* in an aqueous nutrient medium under aerobic conditions in the presence of an inhibiting amount of a compound selected from the group consisting of aminopterin and the alkali metal salts thereof.

2. The process of claim 1 in which the compound is amniopterin.

3. The process of claim 1 in which the microorganism is *Streptomyces viridofaciens*.

4. A process for the produtcion of 7-chloro-6-demethyltetracycline which comprises cultivating a 7-chlorotetracycline-producing strain of *Streptomyces aureofaciens* in an aqueous nutrient medium containing an available source of chloride ions under aerobic conditions in the presence of an inhibiting amount of a compound selected from the group consisting of aminopterin and the alkali metal salts thereof.

5. The process of claim 3 in which the compound is aminopterin.

References Cited in the file of this patent

UNITED STATES PATENTS 2,987,449    Miller et al. _____ June 6, 1961